United States Patent
Jones, Jr.

(10) Patent No.: US 6,843,016 B1
(45) Date of Patent: Jan. 18, 2005

(54) WEEDLESS LURE FOR WACKY STYLE FISHING

(76) Inventor: Nyles Kelley Jones, Jr., 1610 Cherokee, Deer Park, TX (US) 77536

(*) Notice: Subject to any disclaimer, the term of this patent is extended or adjusted under 35 U.S.C. 154(b) by 84 days.

(21) Appl. No.: 10/235,330

(22) Filed: Sep. 5, 2002

(51) Int. Cl.$^7$ .............................................. A01K 85/00
(52) U.S. Cl. ..................... 43/42.26; 43/42.24; 43/42.28
(58) Field of Search ......................... 43/42.24, 42.06, 43/42.31, 42.26, 42.28

(56) References Cited

U.S. PATENT DOCUMENTS

| | | | | |
|---|---|---|---|---|
| 885,861 A | * | 4/1908 | Pepper | 43/42.26 |
| 2,523,536 A | * | 9/1950 | Maddux | 43/42.06 |
| 2,775,839 A | * | 1/1957 | Kuslich | 43/42.03 |
| 3,162,971 A | * | 12/1964 | Gilliam | 43/42.3 |
| 3,585,749 A | * | 6/1971 | Dieckmann | 43/42.06 |
| 3,631,626 A | * | 1/1972 | Keenan | 43/42.24 |
| 3,724,116 A | * | 4/1973 | Lindner et al. | 43/42.24 |
| D227,464 S | * | 6/1973 | Weldon | 43/42.24 |
| D229,933 S | * | 1/1974 | Fitzpatrick | 43/42.24 |
| D231,453 S | * | 4/1974 | Haggard | 43/42.26 |
| 3,802,115 A | * | 4/1974 | Auten et al. | 43/42.31 |
| 3,959,912 A | * | 6/1976 | Lee | 43/42.28 |
| 4,047,318 A | * | 9/1977 | Mapp | 43/42.24 |
| 4,167,076 A | * | 9/1979 | Weaver | 43/42.24 |
| 4,312,148 A | * | 1/1982 | Hardwicke, III | 43/42.24 |
| 4,316,343 A | * | 2/1982 | Creme | 43/42.24 |
| 4,619,069 A | * | 10/1986 | Strickland | 43/42.26 |
| 4,771,564 A | | 9/1988 | Whitley | 43/4 |
| 4,790,100 A | * | 12/1988 | Green, Sr. | 43/42.26 |
| 4,799,329 A | * | 1/1989 | Paulsen | 43/42.28 |
| 4,912,871 A | * | 4/1990 | Brady | 43/42.26 |
| 5,121,568 A | * | 6/1992 | Lindmeyer | 43/42.31 |
| 5,167,088 A | * | 12/1992 | Wardall | 43/42.03 |
| 5,276,992 A | * | 1/1994 | Kato | 43/42.06 |
| 5,353,540 A | * | 10/1994 | Ward | 43/42.24 |
| 5,408,780 A | * | 4/1995 | Chambers, Sr. | 43/42.24 |
| 5,625,975 A | * | 5/1997 | Imes | 43/42.24 |
| 5,894,692 A | * | 4/1999 | Firmin | 43/42.28 |
| 5,934,008 A | * | 8/1999 | Rice | 43/42.26 |
| 5,946,847 A | * | 9/1999 | North | 43/42.31 |
| 6,041,540 A | * | 3/2000 | Potts | 43/42.24 |
| 6,094,855 A | * | 8/2000 | Stump | 43/42.24 |
| 6,173,523 B1 | * | 1/2001 | Johnson | 43/42.24 |
| 6,266,916 B1 | * | 7/2001 | Dugan | 43/42.24 |
| 6,408,566 B1 | * | 6/2002 | Ward, Sr. | 43/42.31 |
| 6,564,499 B1 | * | 5/2003 | Firmin | 43/42.26 |
| 2002/0170225 A1 | * | 11/2002 | Gibbs et al. | 43/42.28 |

* cited by examiner

*Primary Examiner*—Darren W. Ark
(74) *Attorney, Agent, or Firm*—Buskop Law Group, P.C.; Wendy Buskop

(57) ABSTRACT

The invention is a flexible fishing lure made of a solid rod, an egg sack connected to the rod forming an angle between 60 and 90, two legs each with a leg head and a tapered leg, wherein the solid rod and the legs have substantially identical conical shapes with substantially identical outer diameters and wherein the egg sack has a conical shape with an outer diameter 0.01 to 0.005 larger than the outer diameter of the solid rod and the legs.

11 Claims, 6 Drawing Sheets

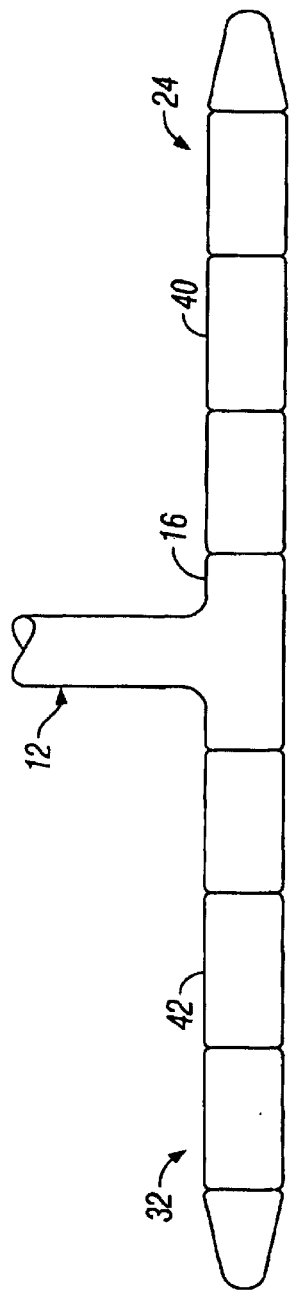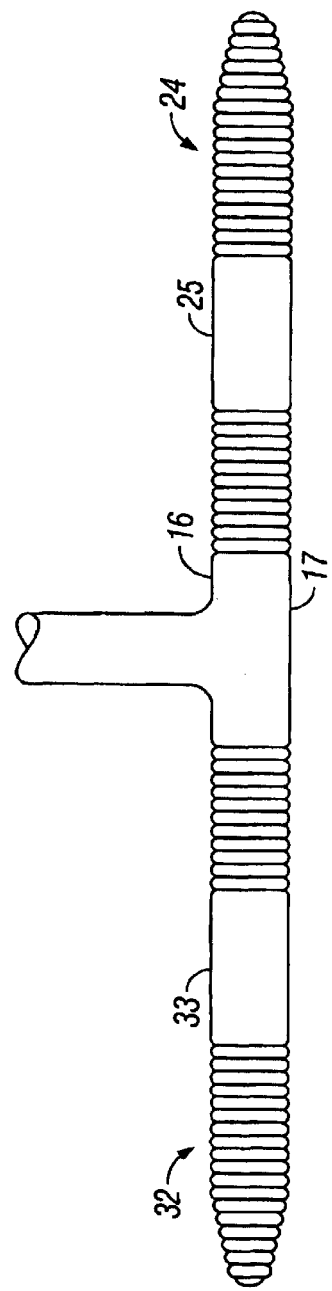

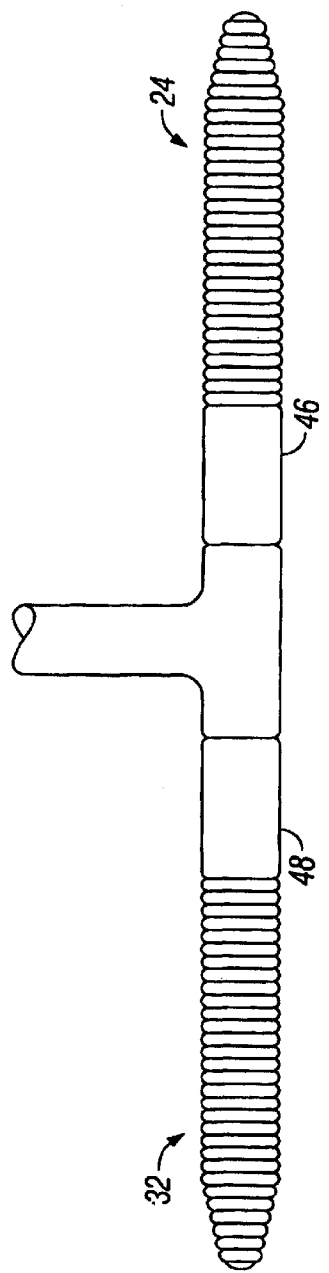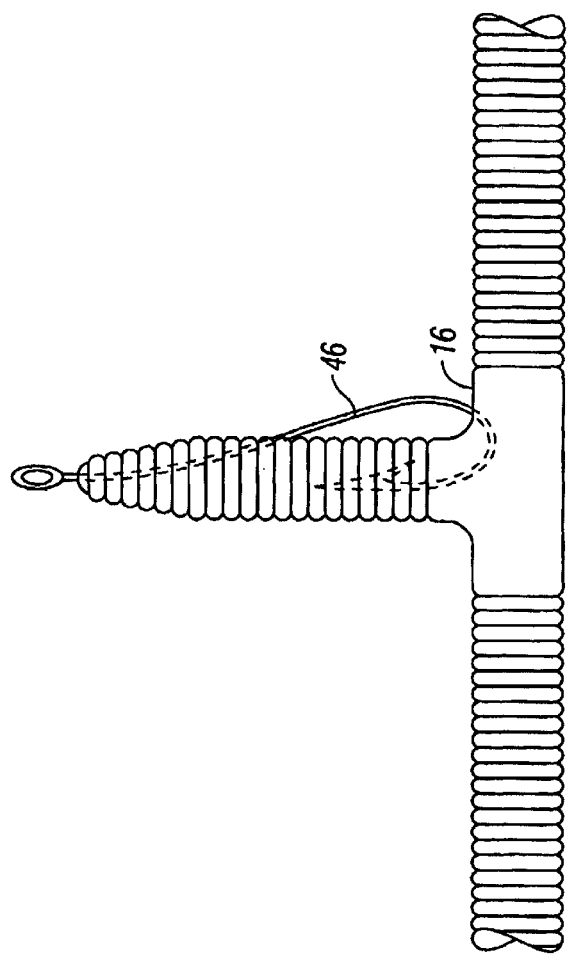

WEEDLESS LURE FOR WACKY STYLE FISHING

FIELD OF THE INVENTION

This invention relates to lures employed in fishing that are used to attract fish in particularly lures used for wacky style fishing.

BACKGROUND OF THE INVENTION

Fishing lures of this type typically attempt to mimic live bait actions by having realistic movements, colors and shapes. Many lures depend solely on the movement rather than the visual realisms to attract fish. A need has existed for a lure, which imitates a worm in appearance, but has the ability to generate vibrations and remain weedless when fished wacky style in all types of heavy cover and have the flexibility to attract fish from a variety of directions.

Prior art lures having water engagement surfaces that will cause the lure to move erratically or vibrate as it is pulled through the water, include U.S. Pat. Nos. 2,523,536; 3,162,971; and 5,167,088. None of these patents, however, address the worm shape.

In U.S. Pat. No. 2,523,536, a fishing lure is disclosed having a main body member with multiple heads extending there from. A large "head" portion is defined by a disk that is pivoted to the main body member. U.S. Pat. No. 3,162,971 shows a sinking artificial lure having a body member with a large front plate portion and wing-like member extending from the rear thereof.

U.S. Pat. No. 5,167,088 is directed to an adjustable fishing lure activator which has a disk shaped activator of sheet plastic installed on the leader just in front of the lure's main body. The activator has a crease extending from a central opening defining an angled area.

Other references with a naturalistic bait-like shape and with water reacting structures include U.S. Pat. Nos. 2,775,839; 3,585,749; and 5,276,992.

In U.S. Pat. No. 2,775,839, a fishing lure with an up/down motion having a fish-like body with the deflector plates pivotally mounted on its front.

U.S. Pat. No. 3,585,749 is a flexible fishing lure having a multi-chambered hollow body through which water passes as it is pulled through the water. A deflector valve opening varies the water volume so that water passes alternately from one chamber to the other imparting a realistic action to the lure.

U.S. Pat. No. 5,276,992 shows a lure having a hollow head portion through which water passes exiting through the gills thereby imparting motion to the lure by the effective water flow.

A need has long existed for a worm like lure with the combined ability to cause vibration in the water, capable of holding or offering attractant to a fish, that is flexible and able to slide through weeds, timber, rocks, back brush, etc., and to eliminate a weed guard. The present invention has been designed to meet that need.

SUMMARY OF THE INVENTION

A fishing lure having a life-like worm shape formed in the shape of a "T" having a rod member for hooking, and a first leg and a second leg connected by an egg sack, wherein the first leg, second leg and rod are identical in conical in shape and have identical outer diameters, the lure is formed from a flexible polymer, and the egg sack has a diameter the same as the legs and rod so that the lure will impart realistic movement to the lure as it passes in the water and fall through weeds, cover, etc., without engaging hook contact on any item.

The lure body is preferably of a flexible yielding synthetic resin material. The lure body may contain concentric grooves or spiral groove creating hydrodynamic resistance causing waves that radiate outwardly from the lure into the surrounding water.

BRIEF DESCRIPTION OF THE DRAWINGS

The present invention is detailed below with reference to the listed Figures.

FIG. 3 is a side view of the lure of the invention with 3 egg sacks.

FIG. 4 is a side view of the invention of FIG. 3 with a flat side.

FIG. 5 is a side view of the invention with two flat legs.

FIG. 6 is a detailed view of the invention with a hook in the rod.

DETAILED DESCRIPTION OF THE PREFERRED EMBODIMENTS

Before explaining the present invention in detail, it is to be understood that the invention is not limited to the particular embodiments and that it can be practiced or carried out in various ways.

Figure 1:
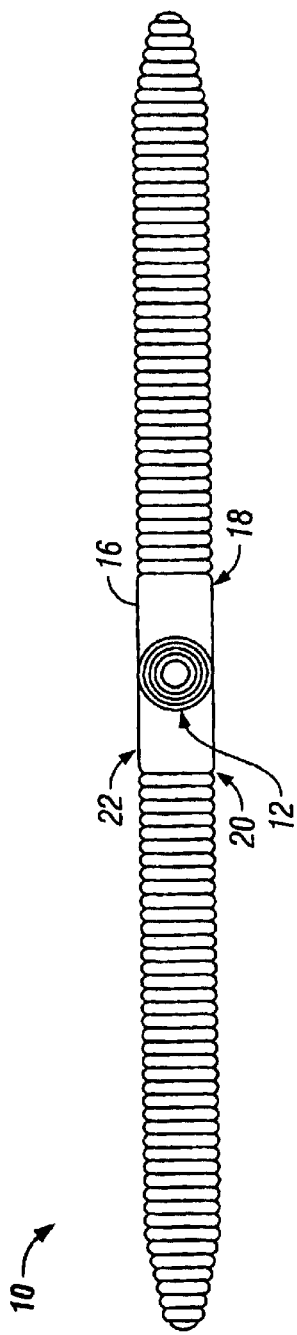
FIG. 1 is a top view of the lure.
Figure 2:
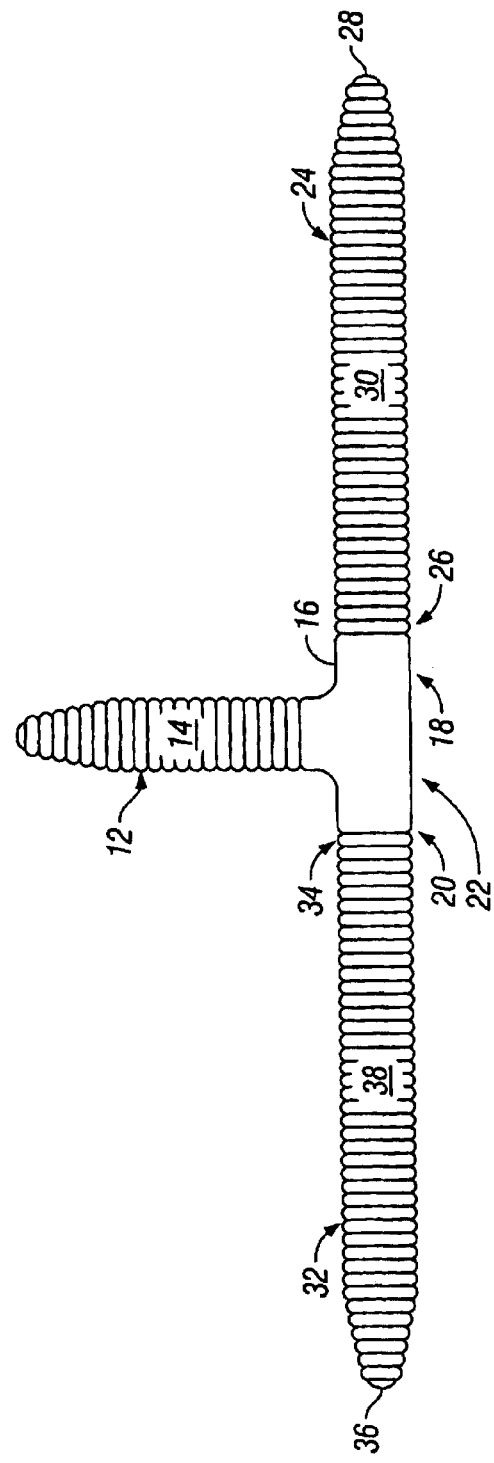
FIG. 2 is a side view of the lure of the invention.

In its preferred and illustrated embodiment, as shown in FIGS. 1 and 2, the 10<lure 10 has a rod 12 having an outer surface 14. An egg sack 16 is connected to the 12 rod forming an angle between 60 and 90 degrees angle. The rod is preferably solid, but a hollow embodiment is also contemplated herein.

The egg sack 16 has a first end 18 and a second end 20 and a smooth outer surface 22.

The lure further consists of a first leg 24 comprising a first leg head 26 connected to the first end of egg sack. The first leg 24 also has a first leg tail 28 and a first leg outer surface 30. The lure has a second leg 32 having a second leg head 34 and a second leg tail 36 and a second leg outer surface 38. The second leg head 34 connects to the second end 20 of the egg sack.

Figure 10A:
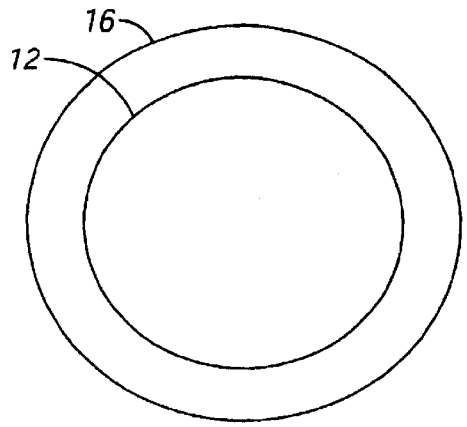
FIG. 10a, FIG. 10b, and FIG. 10c depict a detailed view showing the egg sack baying a cylindrical shape with an outer diameter 0.01 to 0.05 mm larger than the outer diameter of the rod and the first and second legs.
Figure 10B:
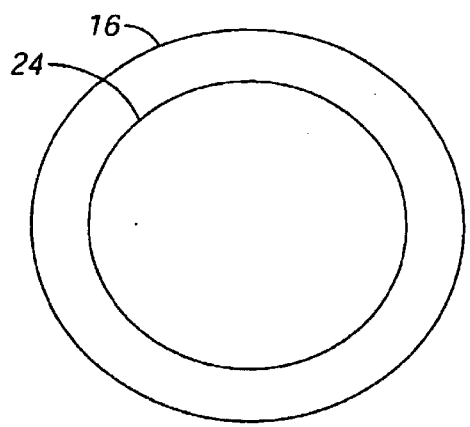
Figure 10C:
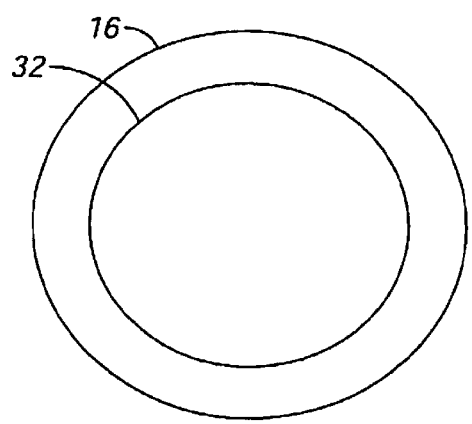

The rod, and the first and second legs have substantially identical conical shapes in a preferred embodiment with substantially identical outer diameters in the most preferred embodiment, one preferred outer diameter is contemplated as 0.375". FIG. 2 depicts the feature that the rod 12, first leg 24, and second leg 32 have substantially identical conical shapes. The egg sack also preferably has a conical shape with an outer diameter between 001–0.05 mm (0.0004–0.002 inches) larger than the outer diameter of the rod 12 and the first and second legs 24 and 32, as shown in FIGS. 10a, 10b, and FIG. 10c. The lack of grooves in the egg sack provide for more strength at the connect point and also provide for the proper bend-point to make lure "wacky style" and initiates the action. If the legs are too close together, then the lure action is less effective for catching fish, this design with separated legs, about 60 degrees from the central axis of the rod, provides an optimum design.

FIG. 3 shows it is contemplated that more than 1 egg sack could be disposed in each leg of the lure. For example in addition to the central egg sack, a second egg sack 40 could also be located in the central part of the first leg 24 and a third egg sack 42 could be located in the central part of the second leg 32.

FIG. 4 shows it is contemplated that the egg sacks could be flat on one side of the outer surface 33, 17, and 25.

Similarly, FIG. 5 shows that the first and the second leg could each have a smooth side 46 and 48 on the outer surface and still create a usable flexible The rod, first and second legs, and the egg sack are preferably made from a flexible synthetic resin, such as from liquid Plastisol available from numerous manufacturers. The preferred materials are polymers of propylene, ethylene, and various polymer-based resins.

In addition, flecks of sparkle or glitter can be added to the resin to attract fish. Glitter from a craft store is typically used, although synthetic polyester glitter can be used. Gold glitter is a preferred glitter for a red plastic lure.

It is also contemplated that pigments can be added to the resin in at least 90 colors, including red, blue, and beige as a preferred color. Dyes could be used instead of pigments in the liquid plastic. It is also contemplated that the lure be painted with paint, such as Pro-Tec Powder Paint available from Bass Pro Shop of Springfield, Mo. It is also contemplated that other UV stabilizers, fillers and antioxidants can be added to the lure to prevent degradation and reduce costs of manufacture.

The first leg, second leg, and rod in the most preferred embodiment all have an outer diameter that is identical and all three appendages are conical in shape. The most preferred outer diameter is contemplated to be 0.375 inch, as measured form the largest ridge, however, diameters of 0.275 inch to ½ inch are considered as usable herein. An outer diameter range between 0.225–0.450 inches are usable.

The egg sack is preferably 1 inch in length with the most preferred length of 1.080 for a 6. 25 inch combined leg length. A range of egg sack lengths would range from 0.575–2.5 inches. For a 7.408-combined leg length lure, a preferred egg sack would be 1.125 inches long. The lure having a preferred leg-to-leg overall length of 6 to 8 inches. However, in the longer lures, it is contemplated that longer egg sacks would be used, preferably between 1 inch and 2 inches in length. For the 6.25-inch lure, the egg sack would have an OD of about 1.080 inches. For the 7.4-inch lure, the egg sack would have an OD of about 1.125 inches. For the 10-½ inch lure, the egg sack would have an OD of between 1.15 and 2.5. It is contemplated that the leg-to-leg overall length would be between 4 and 12 inches long.

In a preferred embodiment, the lure has a dimension from the tip of the first leg to the tip of the second leg of 6. 25 inches. Lures having a length from the tip of the first leg to the tip of the second leg of 7. 408 inches and up to 10½ inches are also contemplated. The $1^{st}$ and $2^{nd}$ leg lengths for the 6. 250-inch worm would each are 2.5 inches and the preferred rod length would be 1.375 inches. The tapered tails of the legs would have a 0.125-inch OD.

The $1^{st}$ and $2^{nd}$ leg length for the 7.408-inch worm would each be 3.125 inches with a rod length of 1.625 and a tail OD of 0.164.

In another embodiment, the lure could be grooved with concentric ridges that are separated by approximately 0.01 to 0.05 mm (0.000–0.002 inches).

Figure 11:
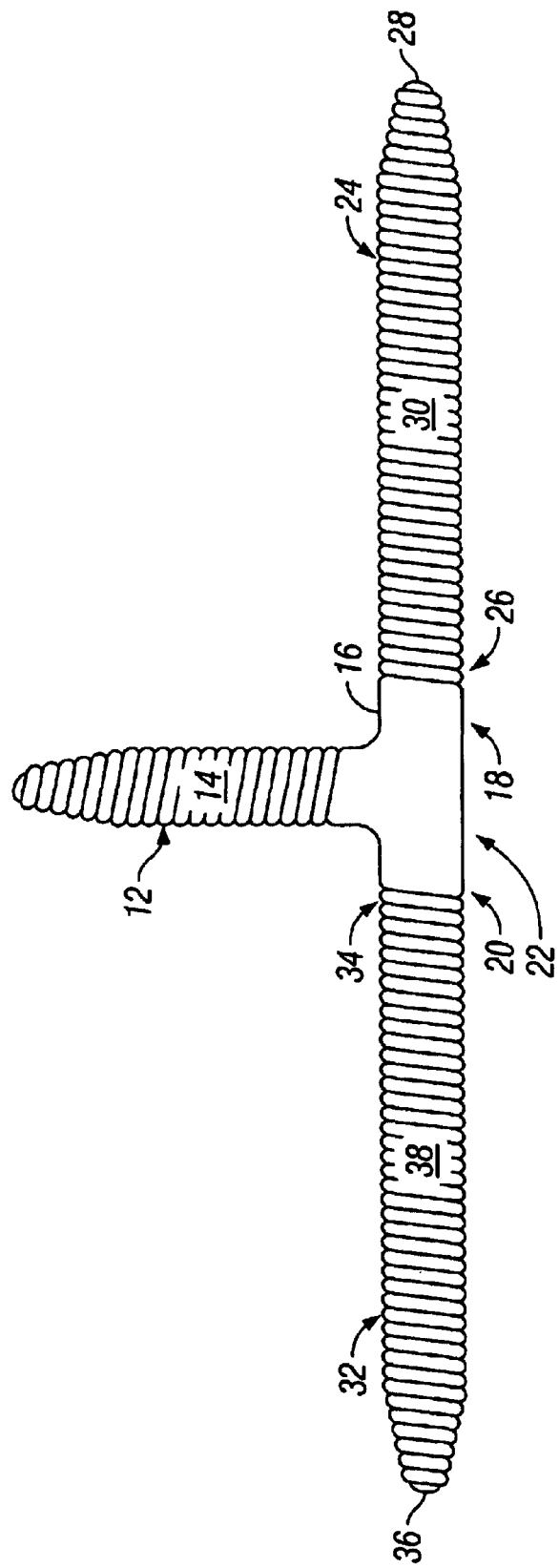
FIG. 11 depicts a side view, wherein spiral ridges are disposed on the surfaces of the solid rod, first leg and second leg.

It is considered that the lure could be constructed with smooth sides. Finally it is contemplated that the lure could have spiral ridges disposed on each leg and on the rod, however the grooved embodiment provides vibration in the water, which increases the attraction to a fish. FIG. 11 depicts the embodiment of spiral ridges disposed on each leg and on the rod.

As shown in FIG. 2, which is a side view of the invention, shows that the first leg and the rod are preferably connected at 90-degree angles with a seamless construction.

FIG. 6 shows a detail of the egg sack usable in the invention. Preferably it is smooth and solid with a hook 46 inserted.

Figure 7:
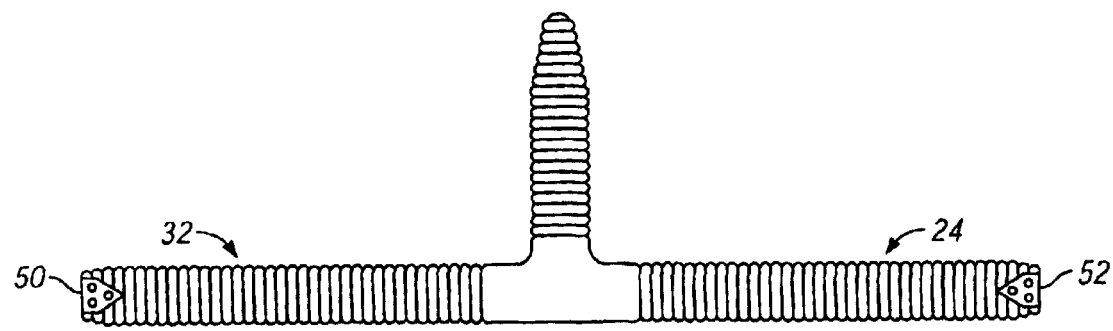
FIG. 7 is a side view of the invention with rattles disposed in the tapered ends.

FIG. 7 shows an embodiment when the invention could have rattles 50 and 52 inserted into the lure legs to attract fish (not in the egg sack). The rattles are on legs that are tapered and end in flat surfaces 53a and 53b. The rattles 50 and 52 can range from 3 mm–7 mm in size or an attractant could be mixed with the plastic resin. The attractant can be, garlic or salt impregnation.

Figure 8:
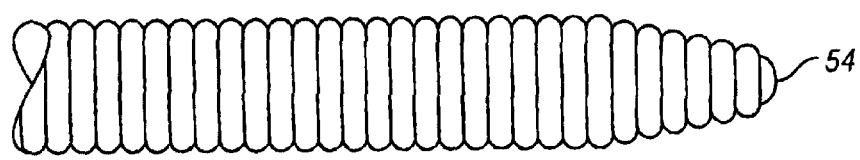
FIG. 8 is a detailed view of a tail of a leg of the invention with the tapered flat end.

FIG. 8 shows in detail that the first leg each tapered from 0375 to 0.164 inches and then the ends are a rounded surface 54. FIG. 8 depicts the first leg tapered to a point that is typically rounded. The second tapered leg, not depicted in FIG. 8, can be tapered to a point in a similar manner.

Figure 9:
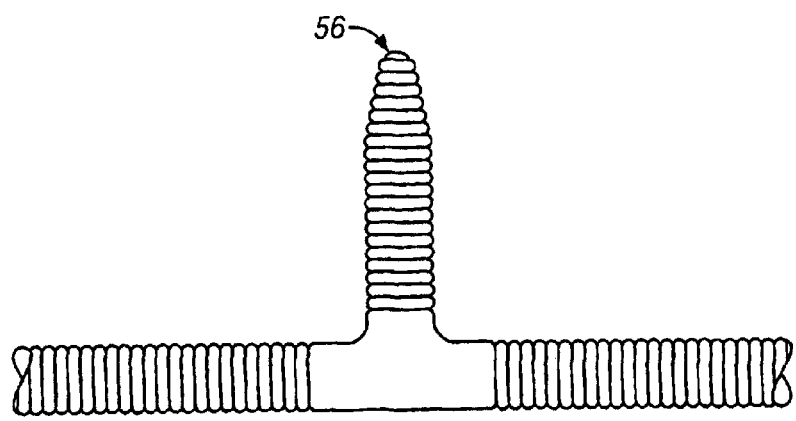
FIG. 9 is a detailed view of the rod of the invention with the rounded top.

FIG. 9 shows in detail that the rod has an end with a rounded top 56, which prevents ripping and tearing of the lure. The rod could also have a tapered end with a flat surface in an alternative embodiment. However, it is possible that the first leg tail and second leg tails can be tapered to a point.

In a preferred embodiment, the lure is conceived having the shape of a "T".

Finally, it is contemplated that and provides the advantageous features and meet the objectives of this invention.

While this invention has been described with emphasis on the preferred embodiments, it should be understood that within the scope of the appended claims, the invention might be practiced other than as specifically described herein.

What is claimed is:

1. An integrally molded one-piece flexible fishing lure comprising:
   a. a solid rod having an outer surface;
   b. an egg sack connected to the rod and forming an angle between 60 and 90 degrees relative to the rod wherein said egg sack has a first end and a second end and a smooth outer surface;
   c. a first leg comprising a first leg head, a first tapered leg tail, and a first leg outer surface, wherein the first leg head is connected to said first end of said egg sack; and
   d. a second leg comprising a second leg head, a second tapered leg tail, and a second leg outer surface and wherein the second leg head is connected to said second end of said egg sack;

e. wherein said solid rod, said first leg, and said second leg have substantially identical conical shapes with substantially identical outer diameters; and f. wherein the egg sack has a cylindrical shape with an outer diameter 0.01 to 0.05 mm larger than the outer diameter of said solid rod, said first leg, and said second leg.

2. The flexible fishing lure of claim 1, wherein said first tapered leg tail and second tapered leg tail are tapered to a point.

3. The flexible fishing lure of claim 2, wherein said first tapered leg tail and second tapered leg tail are tapered and provide flat surfaces on ends thereof.

4. The flexible fishing lure of claim 1, wherein a length from the first tapered leg tail of the first leg to the second tapered leg tail of the second leg is between 4 inches and 12 inches long.

5. The flexible fishing lure of claim 4, wherein the length is between 6 inches and 10-½ inches long.

6. The flexible fishing lure of claim 1, wherein said solid rod, said first leg, and said second leg have an outer diameter between 0.250 inch and 0.450 inch.

7. The flexible fishing lure of claim 1, wherein said solid rod is connected to said egg sack at a 90-degree angle.

8. The flexible fishing lure of claim 1, wherein said flexible fishing lure comprises flexible synthetic resin.

9. The flexible fishing lure of claim 1, wherein said solid rod, said first leg, and said second leg have concentric ridges disposed on the surfaces of said solid rod, said first leg, and said second leg.

10. The flexible fishing lure of claim 1, wherein said solid rod, said first leg, and said second leg have spiral ridges disposed on the surfaces of said solid rod, said first leg, and said second leg.

11. The flexible fishing lure of claim 1, wherein said lure is formed in the shape of a "T".

\* \* \* \* \*